Oct. 7, 1958 F. R. C. BERNARD 2,855,515

TELEVISION TEST APPARATUS

Filed June 30, 1954 2 Sheets-Sheet 1

INVENTOR.
FRANÇOIS R.C. BERNARD
BY
ATTORNEY

Oct. 7, 1958 F. R. C. BERNARD 2,855,515

TELEVISION TEST APPARATUS

Filed June 30, 1954 2 Sheets-Sheet 2

INVENTOR.
FRANCOIS R.C. BERNARD
BY
ATTORNEY 2,855,515

TELEVISION TEST APPARATUS

François René Claude Bernard, Collingswood, N. J., assignor to Radio Corporation of America, a corporation of Delaware Application June 30, 1954, Serial No. 440,453

6 Claims. (Cl. 250—36)

The invention relates to apparatus for testing television system components, and it particularly pertains to apparatus for producing a visual display indicative of the degree of linearity of kinescope deflection circuitry or the registration of color television camera devices.

It is highly desirable that in electron television transmission and reception systems, the scanning of the image to be transmitted and the reproduction of that image should be done by electron beam movement which is uniform with respect to time. In other words, the cathode ray beam deflecting means which are to be used with television camera, image-reproducing and other cathode ray beam devices should be arranged to provide a linear deflection of such beams in both the horizontal and vertical directions. This is true in both monochrome, or black and white, and color television systems. In present day color television practice, the cameras are provided with a plurality of scanning tube pickup devices, each pickup device being responsive to light of a particular component color. Present color cameras employ three such pickup devices, having individual cathode ray beam deflecting circuitry, for obtaining red, green and blue image information. Not only is it essential that the cathode ray beam deflecting circuitry of the color cameras provide linear deflection, but that they be so co-ordinated that the color signals produced by the plurality of cameras can be combined for transmission purposes in a manner such that the separate images have the proper registration both horizontally and vertically for accurate reproduction by the intended color receivers.

In view of the importance of obtaining linear deflection of cathode ray beam devices and perfect registration of color camera devices, various proposals have been made in an effort to provide adequate means and methods for obtaining the desired results. The prior art proposals have separated the problem and have, for the most part, required the observation of coincidence of a plurality of images on a television image-reproducing device. These proposals have, therefore, been objectionable in that the results are dependent upon the ability of an operator to determine coincidence as against non-coincidence and that the final registration obtained is prevented from being completely accurate by the great amount of conflicting information such as shading, noise and the like. To overcome the latter problem, it has been suggested that the difference between two images, required to be registered be indicated, but the absence of any indication of the linearity of the arrangement is a disadvantage.

An object of the invention is to provide improved means for checking the linearity of the cathode ray beam deflecting circuitry of kinescopes and television cameras.

Another object of the invention is to provide improved means and an improved method for checking the registration of a color television camera.

A further object of the invention is to provide apparatus for producing a reference signal wave which may be conveniently compared to a test pattern scanned by a television camera or which may be conveniently used to establish such a test pattern, for scanning by a camera, on the face of a cathode ray image reproducing device or kinescope.

Still another object of the invention is to provide means whereby the overall condition of registration of a plurality of television pickup camera devices may be determined at a glance.

A still further object of the invention is the provision of means whereby a visual indication of both horizontal and vertical linearity and/or registration is simultaneously available.

The objects of the invention are obtained by generating, as a reference signal wave, an accurate bistatic test signal wave of such characteristics that when applied to the intensity modulating means of a cathode ray oscillograph, or kinescope, a two-dimensional image of alternating light and dark squares, or checkerboard, will be produced on the screen. The linearity of an electronic television camera device is determined by optically scanning another checkerboard pattern having the same number of elements as the checkerboard image which is producible by the use of the reference signal wave, and comparing the two signal waves. Preferably, the two signal waves are compared by applying them to the input circuits of a differential amplifier to the output circuit of which a cathode ray oscilloscope, or kinescope, is connected to display the resultant of the two signals. If the linearity of the deflection circuitry of the television camera device corresponds to that produced by the reference wave generator, an overall gray image is produced on the oscilloscope coupled to the output circuit of the differential amplifier.

Any non-linearity of the deflection circuitry of the television camera device will be evidenced by light and dark lines running transversely to the direction of non-linearity. That is, in a black and white television system if the horizontal deflection circuitry is non-linear a series of dashed lines, of alternating black and white portions, will be seen extending vertically of the raster. Obviously, if both the horizontal and vertical linearity are affected two sets of such lines will be seen in the image, the lines of the sets being at right angles. Even the less skilled technician can correct the linearity of the deflection circuitry merely by adjusting the linearity controls until the dashed lines just disappear. This arrangement will serve equally well for both monochrome, or black and white, and color television cameras.

Now with color television cameras having a plurality of scanning tube pickup devices, it is necessary that each pickup device produce component color signals that aid in an exact reproduction of the image of the color receiver. This registration of the component colors is attained according to the invention by substituting one of the other camera devices for the reference signal generator whereby the linearity of the other camera device is checked with reference to the first camera device which has already been calibrated against the reference signal wave. Once the other camera device is registered, another camera device is registered with the calibrated camera device, and so on until all of the camera devices have been registered with the calibrated device.

The arrangement as thus described can also be used to check the linearity of the cathode ray beam deflection circuitry of a kinescope with only a slight modification. In this case a television camera device which has been checked for linearity as described above is used to scan the face of a kinescope to which a checkerboard signal from the reference wave generator is applied. In other words, the checkerboard pattern now scanned by the camera is a pattern established on the face of a kinescope by feeding output from the reference wave signal generator to this kinescope. As before, the signals from both the camera and the checkerboard generator are applied to the differential amplifier.

The cathode ray beam deflection circuitry of the camera device must be synchronized with the reference signal wave generator and, if the kinescope is used to establish the checkerboard test pattern, it is also synchronized with the other apparatus components. This synchronization of scanning, signal generating and beam deflecting is accomplished by feeding a standard synchronizing signal wave to all of the components to be synchronized.

According to the invention, the bistatic reference wave signal generator comprises an astable reciproconductive circuit, or multivibrator, having a frequency of a multiple of the line scanning rate for producing a bistatic, or square, wave to be applied to a video output circuit by way of a phase inverter circuit, and a second astable reciproconductive circuit, or multivibrator, having a frequency of a multiple of the vertical scanning rate for furnishing a wave to the phase inverter circuit for periodically reversing the polarity of the horizontal bistatic signal wave. The signal from the horizontal wave generator, having a polarity in accordance with the operation of the vertical generator, is combined with the standard blanking pulse wave to provide a video output signal for application to the apparatus to be tested.

In order that the invention may be more clearly understood and readily put to practice, a specific embodiment thereof, given by way of example only, is described with reference to the accompanying drawing forming a part of the specification and in which.

Figures 1, 2, 3, 4:
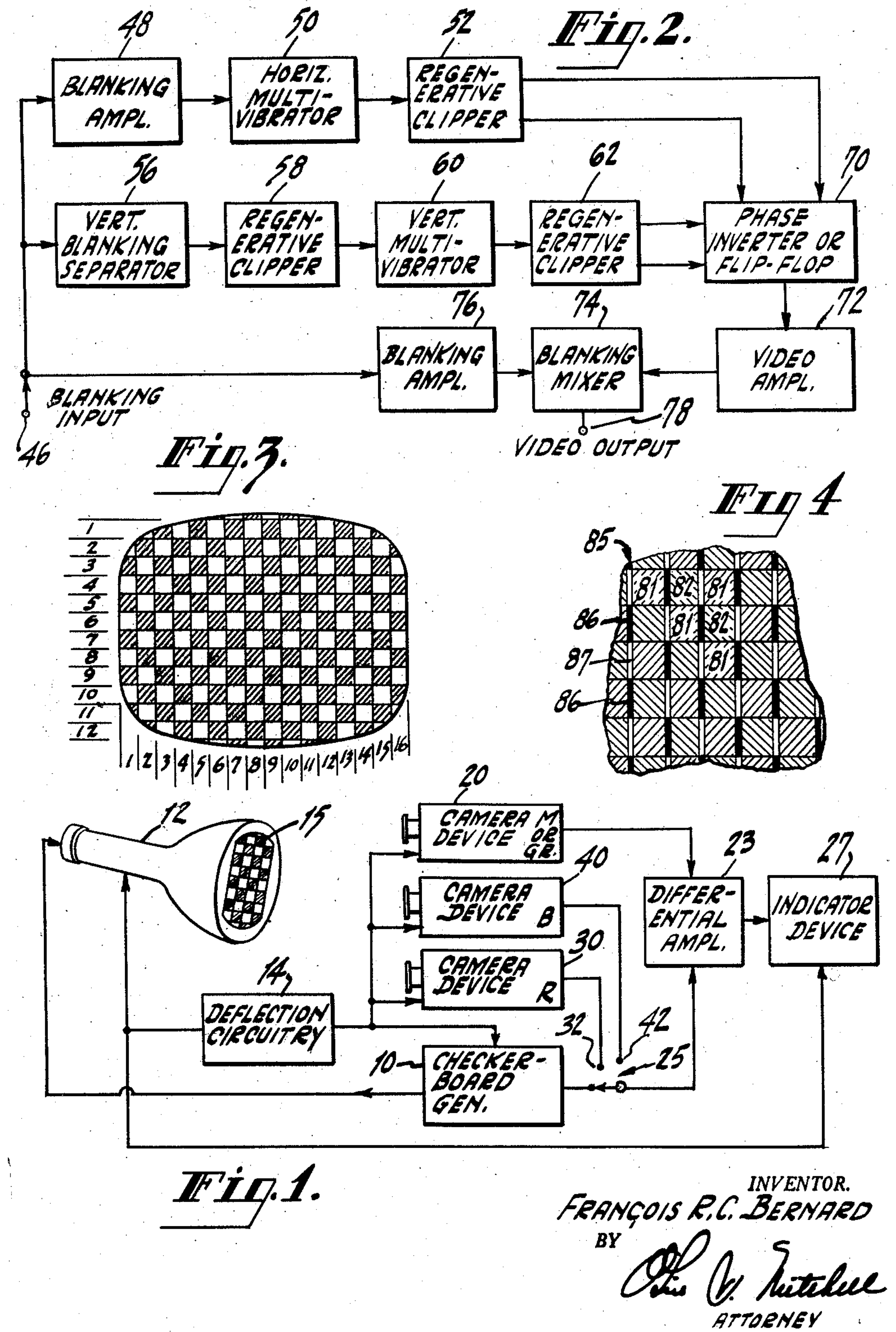
Fig. 1 is a functional diagram of an arrangement for checking the linearity and registration of television picture transmitting and reproducing apparatus.
Fig. 2 is a functional diagram of an embodiment of the reference wave generator shown in Fig. 1.
Fig. 3 is an illustration of a checkerboard pattern which may be established on the screen of a kinescope by means of the arrangement illustrated in Fig. 2.
Figure 5:
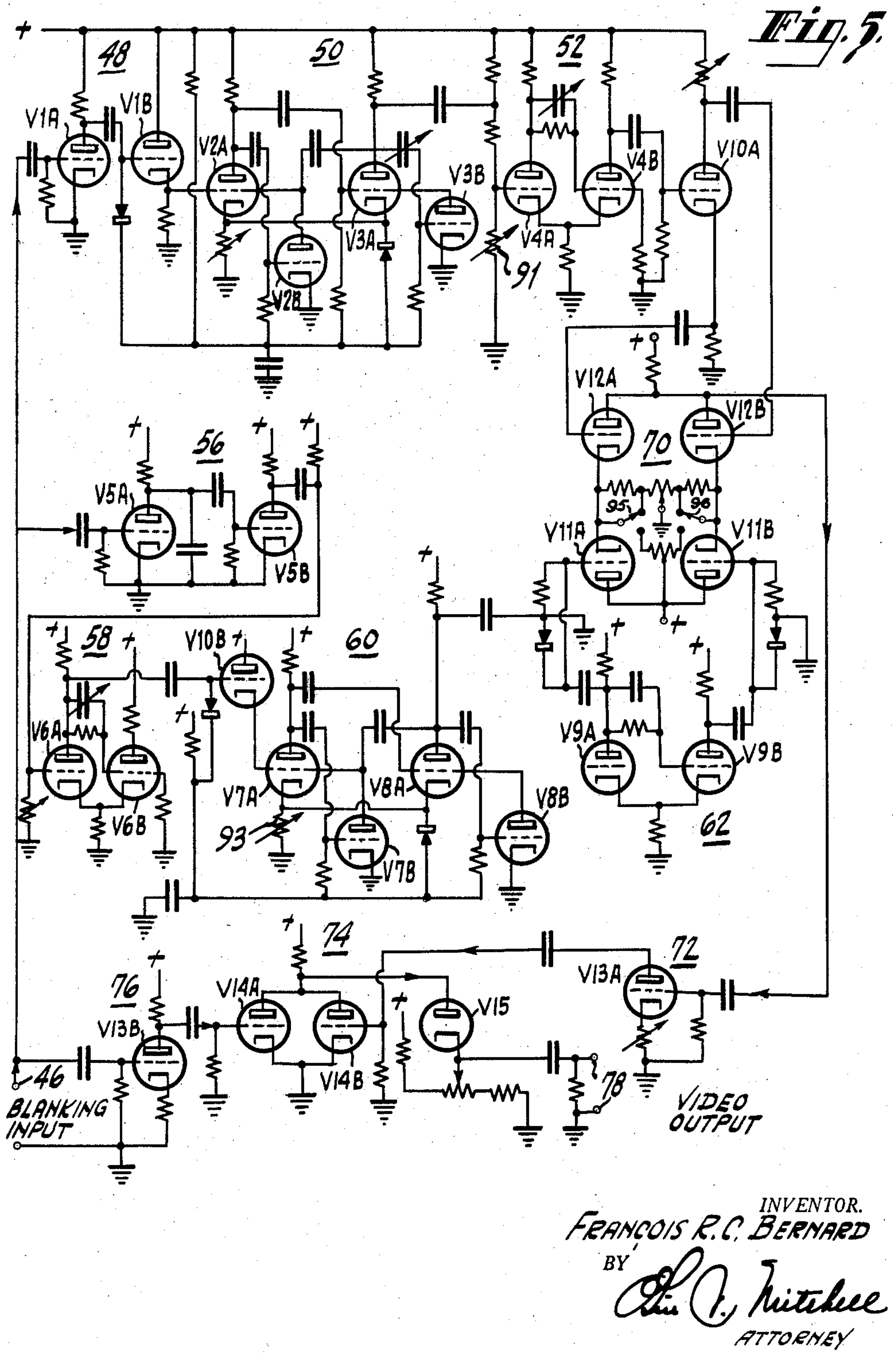

Fig. 4 is an illustration of the pattern seen on the face of the test apparatus indicator kinescope indicating that the horizontal deflection circuitry of a cathode ray beam deflecting device under consideration is non-linear or that there is imperfect registration between the horizontal deflection circuitry of two cathode ray beam deflecting devices under consideration; and Fig. 5 is a schematic diagram of the embodiment of the reference wave generator illustrated in the functional diagram of Fig. 2.

A functional diagram of an arrangement for checking the linearity of a given cathode ray beam deflecting device or analyzing the registration of a plurality of such devices is shown in Fig. 1. The heart of this arrangement is a bistatic reference wave signal generator 10 which produces a bistatic wave of such characteristics that when it is applied to the intensity modulating circuitry of a cathode ray image reproducing device 12, synchronized with operation of the reference wave signal generator 10 by means of known deflection synchronizing circuitry 14, a checkerboard image 15 of alternate light and dark squares will be formed. This reference wave generator 10 is therefore more familiarly known to the artisan as a checkerboard generator and will be so referred to hereinafter. The term bistatic wave as used hereinafter is construed to include any flat topped electric wave rapidly varying between two discrete static amplitude levels. Such a bistatic wave might, for example, vary between a positive value and a negative value, two positive values, or two negative values, or between either a positive or negative value and a neutral value such as zero or ground potential.

A television camera device 20, which may be either a monochrome, or a color camera as the case may be, is arranged to scan a checkerboard test pattern 15, which in this case is preferably in the form of a ruled chart rather than an image displayed on the face of any kinescope or cathode ray beam device 12 in order to eliminate any error due to non-linearity of the kinescope deflection circuitry. The output from the television camera device 20 is applied to one input terminal of a differential amplifier 23 to the other input terminal of which the checkerboard generator 10 is connected by way of a selector switch 25. The output of the differential amplifier 23 is applied to an indicator device 27. The indicator 27 may be any form of electric indicator, such as a sensitive galvanometer, arranged to give an indication of the instantaneous difference in current or potential applied to the differential amplifier 23 but is preferably in the form of a cathode ray beam image reproducing device, or kinescope, which is synchronized with the other components by means of connections to the deflection synchronizing circuitry 14. Those skilled in the art will readily understand that each component need have only the minimum cathode ray beam deflection circuitry therein and the remainder of the known deflection circuitry driving components may be found in the common circuitry 14 or that the latter unit 14 may contain only the components required for synchronizing the sweep of the various cathode ray beams and each of the other components has its own individual deflection system.

The indicator device 27 may be used to obtain the relative value or degree of non-linearity of the deflection circuitry of the camera device 20 as compared with the reference signal from the checkerboard generator 10. Such information, however, is of little use, except perhaps in checking the tolerance of circuit components. Preferably, the non-linearity will be observed on the indicator 27 and the deflection circuitry of the camera device 20 will be adjusted until the indicator 27 shows that there is the required linearity with respect to the standard established by the reference wave generator 10. As stated hereinbefore this adjustment is essentially the same for any television camera device 20 whether it be a monochrome pickup device, or one of a plurality of polychrome pickup devices, each limited to a predetermined range of the chromatic spectrum as presently used in color television.

With a television camera device 20 that has been adjusted to the optimum linearity, the circuit arrangement shown in Fig. 1 can be used to adjust the linearity of the cathode ray beam deflecting circuitry of an image reproducing device, such as the kinescope 12. The reference wave obtained from the checkerboard generator 10 is applied to the kinescope 12 to produce a checkerboard pattern 15, which may be unsatisfactory due to the non-linear deflection circuitry of the kinescope 12. The signal applied to the differential amplifier 23 by way of the television camera device 20 will be adversely affected, with respect to the signal from the checkerboard generator 10 directly applied to the differential amplifier 23, only to the extent of non-linearity of the deflection circuitry of the kinescope 12, since the camera device 20 has been previously adjusted so that the deflecting circuitry is of known linearity and is within the desired tolerance. By adjusting the cathode ray beam deflecting circuitry of the kinescope 12 by observing the pattern on the indicator device 27 the required linearity can be attained. This procedure and apparatus arrangement is of great advantage in checking the deflection circuitry of monitor kinescopes used in television broadcasting stations.

Another and possibly more important problem is found in color television applications wherein three camera devices 20, 30 and 40 are used together to obtain the picture information in the respective component colors. The required registration of such a set of polychrome television camera devices is obtained by first checking the linearity of one of the camera devices 20, for example, the green camera device, as described above by comparing the output thereof with the output of the checkerboard generator 10. Registration of the red camera device 30 with respect to the green camera device 20 is then accomplished by throwing the selector switch 25 to the position 32 corresponding to the red camera device 30. The two camera devices 20 and 30 are then used to scan a checkerboard test pattern 15 (preferably on a ruled chart rather than on the kinescope 12) and the cathode ray beam deflection circuitry of the television camera device 30 is adjusted as indicated by the indicator kinescope 27, to registration with the green camera device 20. Thereafter the selector switch 25 is thrown to the position 42 to select the blue television camera device 40 and the latter camera device is then adjusted to registration with the green camera device 20 again by observing the indicator device 27. Thus the required registration between the three component color cameras 20, 30 and 40 is obtained and at the same time the required linearity of each of the deflecting circuitry is achieved, which result was not possible with any of the arrangements of the prior art. In aligning one three color camera in practice, one percent linearity and the equivalent registration were obtained very quickly, where only two percent linearity and equivalent registration were ever obtained before on this camera using prior art apparatus.

The components shown in the functional diagram of Fig. 1 may be entirely conventional except for the checkerboard reference wave generator 10. The functional diagram of a reference wave or checkerboard generator 10 according to the invention is shown in Fig. 2. Essentially the checkerboard signal generator 10 is arranged to provide that portion of a television signal which would correspond to the video output signal of a camera device which is scanning a checkerboard test pattern with the necessary blanking periods observed. Therefore, the circuit is arranged to produce video frequency signals only between the horizontal blanking pulses of a standard blanking level signal applied to the blanking signal input terminals 46. These blanking signal pulses are applied through a blanking pulse amplifier 48 to an astable reciproconductive circuit, or multivibrator, 50. The term reciproconductive circuit as used herein is construed to include all plural-controlled-electron-flow-path-device circuit arrangements in which conduction is reciprocated between two paths each of which contain at least one controlled electron flow path device. Examples of controlled electron flow path devices as the term is construed herein are found in high vacuum tubes, transistors, and the like. The most common example of such a reciproconductive circuit is the multivibrator or astable reciproconductive circuit. As used herein the term "multivibrator" is construed to include only the astable reciproconductive circuit sometimes redundantly described as a "free-running multivibrator," whether synchronized or not. Another form of reciproconductive circuits is the monostable form which is sometimes referred to as a "trigger circuit," a "self-restoring trigger circuit," or as a "flip-flop." Other forms of the reciproconductive circuit are bistable in nature and are aportioned between the lockover reciproconductive circuit having two triggering input terminals and in which two separate triggers are alternately applied to the input terminals to complete one cycle of operation and the "binary" reciproconductive circuit which is one in which there is but one set of input terminals and in which the condition of conduction is inverted each time a trigger is applied to the input terminals. This latter circuit is often called a "binary" or an "Eccles-Jordan circuit," while the former is sometimes referred to as a "locking circuit" or a "flip-flop circuit." It is because of this inconsistency of applying these terms to the various forms that the more formal terms are used hereinafter.

The horizontal astable reciproconductive circuit 50 is held inoperative by the horizontal blanking pulses, but between pulses this circuit oscillates at a frequency or recurrence rate of an integral number of cycles at the horizontal scanning rate to produce a bistable wave output signal which is applied to a regenerative clipping circuit 52 in order to improve the rise time and square up the bistatic wave. These clipping circuits, which are monostable reciproconductive circuits, preferably also have controls with which to adjust the symmetry of the square wave obtained from the astable reciproconductive circuit 50. The output of the horizontal regenerative clipping circuit 52 if mixed with blanking pulses and applied to the kinescope of a television receiver would result in alternate black and white vertical bars across the face of the kinescope. At 126 kc. sixteen such bars would be formed. In order to form the checkerboard pattern the phase relationship of the signal obtained from the horizontal regenerative clipping circuit 52 must be inverted periodically so that instead of alternating vertical light and dark bars, bands of alternate light and dark blocks are produced. In order to do this the blanking signal pulse wave obtained at the terminal 46 is applied to a blanking signal separator circuit 56 from which the vertical blanking signal pulses are stripped from the standard composite blanking signal and applied to a regenerative clipper 58 for application to a vertical astable reciproconductive circuit, or multivibrator, 60. The vertical astable reciproconductive circuit 60 is also held inoperative for the duration of the vertical blanking signal pulses and oscillates freely after being triggered by the trailing edge of the vertical blanking pulse at 360 C. P. S. to divide the pattern into twelve bands in the vertical direction, thereby retaining the 4:3 aspect ratio, which is standard in United States television broadcasting. The output square wave from the vertical astable reciproconductive circuit 60 is applied to another regenerative clipping circuit 62. Like the horizontal reciproconductive circuit 50, the vertical reciproconductive circuit 60 is held inoperative by the vertical blanking pulses so that in effect the two reciproconductive circuits are synchronized one with the other. The high frequency square wave output of the horizontal regenerative clipping circuit 52 is applied to a phase inverting bistable reciproconductive circuit which serves as a combining circuit 70. The two square waves are associated in the combining circuit 70 to produce a third square wave at the output thereof which is of the same frequency as the output from the horizontal reciproconductive circuit 50 but due to combining with the lower frequency wave of the vertical reciproconductive circuit 60 the phase is reversed twice during each cycle of the vertical astable reciproconductive circuit 60 which is set to produce an integral number *n* of oscillations within the vertical active time. This reversal of phase of twice *n* times during the vertical scan will produce the desired checkerboard pattern. The output of the combining circuit 70 is applied by way of a video frequency amplifier 72 to a blanking mixing circuit 74 where blanking pulses obtained at the blanking pulse input terminals 46 are applied through the intermediary of a blanking amplifier 76 for presentation at the video output terminals 78.

The test pattern as shown in Fig. 3 is produced by the checkerboard generator operating in conjunction with the conventional cathode ray beam deflection circuitry of the kinescope as used in the ordinary home receiver. At the beginning of a scan field both the horizontal and vertical astable reciproconductive circuits 50, 60 are released by the respective blanking pulses. As the first line is scanned the horizontal reciproconductive circuit produces alternate positive and negative signals which are reproduced in the kinescope as black and white line portions. Subsequent horizontal lines are produced by the triggering of the horizontal reciproconductive circuit 50 by the succeeding horizontal blanking pulses. These lines retain the same time-phase relationship so that the white and black portions of the lines, with the first line, reproduce white and black areas well into vertical alignment. The horizontal astable reciproconductive circuit 50 operating alone would simply produce alternate black and white vertical bars on the face of the kinescope, but as further lines are scanned the square waves obtained from the vertical reciproconductive circuit 60 which are impressed upon the phase inverting combining circuit 70 causes the pulses from the horizontal reciproconductive circuit 50 to be reversed in phase. Thus, during alternate periods of wave reversal due to the action of the vertical reciproconductive circuit 60, the vertical bars that would be produced by the horizontal reciproconductive circuit are broken into squares and the checkerboard pattern shown in Fig. 3 is formed thereby.

In Fig. 4 there is shown a section of kinescope screen for the indicator device 27 which illustrates the indication of non-linearity of misregistration. The alternate squares 81, 82, which were black and white, or light and dark component colors are reproduced as an in-between shade of gray, with only a slight demarcation between the squares. This demarcation is actually helpful in adjusting the linearity or registration of the apparatus under test. As shown in Fig. 4 the vertical linearity, or registration, is indicated as being perfect, there being little or no demarcation between the various blocks in the vertical direction. In this illustration, there is indicated a serious non-linearity or misregistration of the horizontal sweep as indicated by the vertical bands of alternate light and dark, or black and white portions 85. Thus, in one glance the overall linearity or misregistration is seen. In misregistration the vertical bands 85 may be of rather uniform width, though not always, whereas in the case of non-linearity there is almost always differing widths. With this overall indication before him, the technician adjusts the deflecting circuitry of the apparatus under test until the bands disappear. If in making such an adjustment the bands disappear and then reappear, the operator knows at once that he has adjusted too far in one direction and merely reverses the direction of adjustment until the bands again just disappear.

Referring to Fig. 5 there is shown a schematic diagram of the checkerboard generator 10 of Fig. 1 as outlined in the functional diagram of Fig. 2. The horizontal blanking pulses appearing at the input terminals 46 are applied to the pulse amplifier 48 comprising cascaded electron discharge devices in the form of vacuum tubes V1A, V1B, the latter of which is operated as a cathode follower for application to the horizontal astable reciproconductive circuit 50 actually consisting of two monostable reciproconductive circuits comprising electron discharge devices in the form of triode vacuum tubes V2A, V3B respectively.

The horizontal reciproconductive circuit 50 is held inactive by the presence of the negative blanking pulses, but between pulses the circuit oscillates after being triggered by the trailing edge of the blanking pulse at 125 kc. to produce the desired bistatic output wave signal. The proper phase relationship for the horizontal- and vertical-astable reciproconductive circuits is assured by the monostable action of the component circuits. If another type of astable reciproconductive circuit is used initial phasing may be provided as disclosed by A. Liguori in U. S. patent application Ser. No. 266,386, filed January 14, 1952, now Patent Number 2,685,613, dated August 3, 1954. The output of the horizontal reciproconductive circuit 50 is obtained at the anode of the vacuum tube V3A and applied to the grid of a further tube V4A comprising a part of the circuitry of the regenerative clipping circuit 52. The recurrence rate of the astable reciproconductive circuit 50 is eight times the line scanning rate with the components shown in the drawing in Fig. 5 producing a pulse of a width of about three microseconds and effective in producing a checkerboard test pattern having sixteen squares in the horizontal direction. The output of the regenerative clipping circuit 52 is applied to a paraphase amplifier comprising a triode tube V10A.

The horizontal blanking pulses are stripped from the vertical blanking pulses in the vertical blanking separator 56 comprising a pair of tubes V5A, V5B from which the vertical synchronizing pulses only are obtained for application to the regenerative clipping circuit 58 comprising another pair of triode tubes V6A, V6B. A cathode follower device V10B is coupled to the regenerative clipper circuit 58 to apply the regenerated vertical blanking pulses to the vertical reciproconductive circuit 60 comprising four tubes V7A–V8B. The vertical reciproconductive circuit oscillates at six times the vertical scaning rate to produce pulses of width of approximately 1000 microseconds between vertical blanking pulses. These pulses are cleaned and sharpened by the succeeding regenerative clipping circuit 62 comprising another pair of tubes V9A, V9B. The combining circuit 70 is in the form of a bistable reciproconductive circuit having four tubes V11A–V12B each having a cathode, an anode and a grid. The bistatic wave generated by the horizontal reciproconductive circuit 50 is applied in paraphase relationship as obtained from the paraphase amplifier tube V10A to the grids of the tubes V12A, V12B. The anodes of these tubes V12A, V12B are tied together to reproduce the horizontal bistatic wave as applied to one or the other grids. The phase of the horizontal bistatic wave is reversed by the operation of the application of the vertical square wave derived from the vertical astable reciproconductive circuit as applied in paraphase relationship to the grids of the tubes V11A, V11B. The tubes V11A, V11B are operated as cathode followers cathode-coupled to the tubes V12A, V12B respectively to apply the vertical square wave as obtained from the anodes of the tubes V9A and V9B respectively.

If at a certain instant there is a positive voltage on the grid of V12A, corresponding to the positive part of a cycle of the output vertical reciproconductive circuit 60 operating at 360 cycles per second, then the cathode will be positive and the cathode of the corresponding combining tube V11A is also positive. The tube V11A is then set to cut off but during the same time the tube V12B has a negative voltage on the grid, due to the paraphase relationship, and the cathode of the tube V11B is negative. The tube V11B is caused to conduct and the signal applied to the grid thereof is obtained at the anode. In the other portion of the same cycle of vertical reciproconductive circuit output, the tube V12A will have a negative voltage on the grid and the cathode of the tube V11A being connected thereto will also be negative. The tube V11A will conduct and the signal applied to the grid thereof will be available at the anode. Since the tubes V12A and V12B are fed with the same signal and since the anodes are interconnected there will always be a signal on the anodes. This signal, however, changes phase 180 degrees twice during each cycle of the vertical astable reciproconductive circuit 60. By setting the vertical astable reciproconductive circuit to oscillate at six times the vertical scanning rate the phase of the bistatic wave output from the horizontal reciproconductive circuit will be reversed twelve times and the checkerboard pattern will have twelve squares in the vertical direction. The checkerboard pattern in the example given will then be 16 x 12 squares in keeping with the 4:3 aspect ratio which is standard in American television broadcasting practice.

The bistatic output wave is applied to an amplifier tube V13A and the amplified wave is applied to a mixing circuit 74 comprising the tubes V14A and V14B. Blanking pulses obtained at the blanking input terminals 46 are amplified by the blanking amplifier 76 comprising the tube V13B and the output applied to the mixing circuit 74 to the grid of the tube V14A. The video signal output of the mixer 74 is clipped by an output diode V15 adding a pedestal to the signal if necessary in order to pass it through a normal television transmission system.

Variable resistors 91 and 93 are provided in the circuits of the regenerative clippers 52 and 60 so that the symmetry of the square wave signal derived therefrom can be adjusted. This adjustment is preferably made using an oscilloscope of the usual tolerance found in the laboratory. With such an adjustment the signal obtained from the checkerboard generator shown in Fig. 5 will be perfectly linear.

A pair of switch sections 95, 96 are provided to shunt a tube out of the combining circuit 70 and convert the generator into a bar generator for use in the usual manner for such generators, if desired.

In addition to the use of the checkerboard generator for test purposes as disclosed, it is also suggested that another form of the invention might be used for generating special effects in and about a television studio; for example, establishing a background pattern for commercial announcements and the like, using black and white, or two of the color components of a color kinescope.

The invention claimed is:

1. A bistatic signal wave generator comprising a multivibrator, means to apply a television blanking signal to said multivibrator to block the same for the duration of the blanking signal and to render the same oscillating between blanking pulse signals, another multivibrator, a blanking signal separator coupled between said other multivibrator and said blanking signal applying means to separate the horizontal blanking signal from the vertical blanking signal and render the other multivibrator oscillating between the separated blanking signal pulses, a combining circuit coupled to both of said multivibrators to produce a square wave signal of recurrence rate of one of said multivibrators with phase inversion at twice the recurrence rate of the other multivibrator, and a mixing circuit coupled to said combining circuit and to said blanking signal applying means to interpose blanking signal in the output signal from said combining circuit.

2. A bistatic signal wave generator comprising, an astable reciproconductive circuit of given frequency, another astable reciproconductive circuit of frequency lower than said given frequency, a television blanking signal separator circuit connected between said astable reciproconductive circuits, means to apply television blanking signals to said circuits to block said reciproconductive circuits for the duration of the blanking signal pulses thereby to synchronize the operation of said reciproconductive circuit coupled to said astable reciproconductive circuits to be triggered thereby to produce a square wave signal of said given frequency with the phase thereof inverted at twice said lower frequency.

3. A bistatic signal wave generator as defined in claim 2 and incorporating regenerative clipping circuits between said astable and bistable reciproconductive circuits.

4. A bistatic signal wave generator as defined in claim 3 and incorporating a mixing circuit connected to said bistable reciproconductive circuit and to said blanking signal applying means to interpose blanking signals in the output signal from said bistable reciproconductive circuit.

5. A bistatic signal wave generator as defined in claim 2 and wherein said bistable reciproconductive circuit comprises four electron discharge devices each having a cathode, a grid and an anode, connections between the grids of two of said electron discharge devices and paraphase outputs of one of said astable reciproconductive circuits, the anodes of said two electron discharge devices being intercoupled, the cathodes of said two electron discharge devices being connected individually to the cathodes of the other electron discharge devices, the anodes of the other electron discharge devices being interconnected, connections between the grids of said remaining electron discharge devices and paraphase outputs of the other astable reciproconductive circuit, and resistive connections between said cathodes and a point of fixed direct potential.

6. A bistatic signal wave generator as defined in claim 5 and wherein said two electron discharge devices are connected as cathode followers and are cathode coupled to said other electron discharge device.

References Cited in the file of this patent

UNITED STATES PATENTS

| | | |
|---|---|---|
| 2,449,413 | Proskauer et al. | Mar. 7, 1950 |
| 2,594,383 | Bedford | Apr. 29, 1952 |
| 2,604,534 | Graham | July 22, 1952 |
| 2,648,723 | Goldsmith | Aug. 11, 1953 |
| 2,677,768 | Davison et al. | May 4, 1954 |
| 2,712,064 | Gillette et al. | June 28, 1955 |